US008173166B2

(12) United States Patent
Xiong et al.

(10) Patent No.: US 8,173,166 B2
(45) Date of Patent: May 8, 2012

(54) METHODS OF PRODUCING TUNGSTEN NANOPARTICLES

(75) Inventors: Liufeng Xiong, Columbus, OH (US); Ting He, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1463 days.

(21) Appl. No.: 11/221,779

(22) Filed: Sep. 9, 2005

(65) Prior Publication Data

US 2007/0059544 A1    Mar. 15, 2007

(51) Int. Cl.
*A61K 9/14* (2006.01)
(52) U.S. Cl. .......................................... 424/489; 423/53
(58) Field of Classification Search .................. None
See application file for complete search history.

(56) References Cited

U.S. PATENT DOCUMENTS

| | | | |
|---|---|---|---|
| 4,758,534 A | 7/1988 | Derkits et al. | |
| 5,149,596 A | 9/1992 | Smith et al. | |
| 5,770,172 A * | 6/1998 | Linehan et al. | 423/561.1 |
| 5,772,978 A | 6/1998 | Bailey et al. | |
| 5,897,945 A | 4/1999 | Lieber et al. | |
| 5,911,965 A | 6/1999 | Bailey et al. | |
| 6,290,859 B1 | 9/2001 | Fleming et al. | |
| 6,413,489 B1 | 7/2002 | Ying et al. | |
| 6,502,991 B2 | 1/2003 | Knepper et al. | |
| 6,517,802 B1 | 2/2003 | Xiao et al. | |
| 6,534,044 B1 | 3/2003 | Wada et al. | |
| 6,827,796 B2 | 12/2004 | Holzl et al. | |
| 6,855,749 B1 | 2/2005 | Yadav et al. | |
| 6,869,584 B2 | 3/2005 | Ying et al. | |
| 2002/0009411 A1 | 1/2002 | Zucker et al. | |
| 2002/0034675 A1 | 3/2002 | Starz et al. | |
| 2003/0113447 A1 | 6/2003 | Sherwood et al. | |
| 2004/0009117 A1 | 1/2004 | Lewis et al. | |
| 2004/0171483 A1 | 9/2004 | Takeshima | |
| 2005/0271566 A1 * | 12/2005 | Yadav | 423/1 |
| 2007/0254107 A1 * | 11/2007 | Rao et al. | 427/372.2 |

FOREIGN PATENT DOCUMENTS

| | | |
|---|---|---|
| EP | 0800883 A2 | 10/1997 |
| WO | 2005051435 A2 | 6/2005 |

OTHER PUBLICATIONS

Bonini et al "A New Way to Prepare Nanostructured Materials" J. Phys. Chem. B (2002) vol. 106, pp. 6178-6183.*
Harai, Takayuki, et al., Mechanism of Formation of Titanium Dioxide Ultrafine Particles in Reverse Micelles by Hydrolysis of Titanium Tetrabutoxide; Ind. Eng. Chem. Res.; 1993; pp. 3014-3019, vol. 32, American Chemical Society; Washington, DC, US.
Magnusson, M.H.; Deppert, K.; Malm, J.; Single-crystalline tungsten nanoparticles produced by thermal decomposition of tungsten hexacarbonyl; J. Mater. Res., vol. 15, No. 7, pp. 1564-1569 (Jul. 2000); Materials Research Society.
Landstrom, L.; Lu, J.; Heszler, P.; Size-Distribution and Emission Spectroscopy of W Nanoparticles Generated by Laser-Assisted CVD for Different WF6/H2/Ar Mixtures; J. Phys. Chem. B, 107, pp. 11615-11621 (2003); American Chemical Society.
Koltypin, Y.; Nikitenko, S.I.; Gedanken, A.; The sonochemical preparation of tungsten oxide nanoparticles; J. Mater. Chem. 12, pp. 1107-1110 (2002); The Royal Society of Chemistry.
Lu, Z.; Kanan, S.M.; Tripp, C.P.; Synthesis of high surface area monoclinic WO3 particles using organic ligands and emulsion based methods; J. Mater. Chem. 12, pp. 983-989 (2002); The Royal Society of Chemistry.
Roy, S.; Sigmund, W.; Aldinger, F.; Nanostructured yttria powders via gel combustion; J. Mater. Res., vol. 12, No. 4, pp. 1524-1531 (Apr. 1999); Materials Research Society.
Xie, G.; Song, M.; Mitsuishi, K.; Furuya, K.; Fabrication of ordered array of tungsten nanoparticles on anodic porous alumina by electro-beam-induced selective deposition; J. Vac. Sci. Technol. B., 22(6), pp. 2589-2593, (Nov./Dec. 2004); American Vacuum Society.
Landstrom, L.; Kokavecz, J.; Lu, J.; Heszler, P.; Characterization and modeling of tungsten nanoparticles generated by laser-assisted chemical vapor deposition; J. Applied Physics, vol. 95, No. 8, pp. 4408-4414, (Apr. 15, 2004); American Institute of Physics.
Goetz, M.; Wendt, H.; Composite electrocatalysts for anodic methanol and methanol-reformate oxidation; J. Applied Electrochemistry, 31, pp. 811-817, (2001); Kluwer Academic Publishers.
Zeng, D.; Hampden-Smith, M.J.; Synthesis and Characterization of Nanophase Group 6 Metal (M) and Metal Carbide (M2C) Powders by Chemical Reduction Methods; Chem. Mater., 5, pp. 681-689, (1993), American Chemical Society.
Chang, Y.; Wang, H.; Chiu, C.; Cheng, D.; Yen, M.; Chiu, H.; Low-Temperature Synthesis of Transition Metal Nanoparticles from Metal Complexes and Organopolysilane Oligomers; Chem. Mater., 14, pp. 4334-4338, (2002), American Chemical Society.
Kaneda, I.; Sogabe, A.; Nakajima, H.; Water-swellable polyelectrolyte microgels polymerized in an inverse microemulsion using a nonionic surfactant; J. Colloid and Interface Science, 275, pp. 450-457, (2004), Elsevier.
Lee, H.S.; Lee, W.C.; Furubayashi, T.; A comparison of coprecipitation with microemulsion methods in the preparation of magnetite; J. Applied Physics, vol. 85, No. 8, pp. 5231-5233, (Apr. 15, 1999); American Institute of Physics.
Vestal, C.R.; Zhang, Z.J.; Magnetic spinel ferrite nanoparticles from microemulsion; Int. J. of Nanotechnology, vol. 1, Nos. 1 / 2, pp. 240-263, (2004), Inderscience Enterprises Ltd.
Fang, J.; Shama, N.; Tung, L.D.; Shin, E.Y.; O'Connor, C.J.; Stokes, K.L.; Caruntu, G.; Wiley, J.B.; Spinu, L.; Tang, J.; Ultrafine NiFe2O4 powder fabricated from reverse microemulsion process; J. Applied Physics, vol. 93, No. 10, pp. 7483-7485, (May 15, 2003); American Institute of Physics.
Lu, C.; Chang, H.; Yen, C.; Reverse Microemulsion Synthesis and Electrochemical Properties of LiNiO2 Powders; Tamkang J. Science and Engineering, vol. 7, No. 4, pp. 199-204 (2004).

\* cited by examiner

*Primary Examiner* — Bethany Barham
(74) *Attorney, Agent, or Firm* — Capitol City TechLaw, PLLC; Mark E. Duell (57) ABSTRACT

The present teachings are directed methods of producing tungsten-containing nanoparticles, specifically tungsten nanoparticles and tungsten oxide nanoparticles with an average particle size of less than about five nanometers.

13 Claims, 7 Drawing Sheets

METHODS OF PRODUCING TUNGSTEN NANOPARTICLES

BACKGROUND

1. Field of the Invention

The present teachings relate to methods of producing tungsten-containing nanoparticles, including tungsten-containing nanoparticles with an average particle size of less than about 5 nanometers. The methods include hydrolyzing or precipitating tungsten-containing components to form nanoparticles in a reverse microemulsion, collecting or precipitating tungsten-containing nanoparticles from a reverse microemulsion, and calcining the tungsten-containing nanoparticles to the desired tungsten required valence state.

2. Discussion of the Related Art

The high surface to volume ratio of nanoparticles, particles with diameters between about 1 and about 100 nanometers, makes them of interest for various uses including magnetic, electronic, catalytic, and pigment applications. Assorted preparative methods including both physical and chemical approaches are known.

Various chemical processes that produce metal or metal oxide-containing nanoparticles utilizing microemulsions and reverse microemulsions are known. See, for instance, U.S. Pat. Nos. 6,869,584 B2; 5,725,802; 5,670,088; and 5,695,901. None of these references teach or suggest any method of forming tungsten or tungsten oxide-containing nanoparticles, including by means of a microemulsion or a reverse microemulsion.

It is known to utilize a reverse microemulsion as a means of providing aqueous nandroplets as nanoreactors or nano-domains, wherein the reaction to form the desired product can be carried out. The aqueous nanodroplets can be stabilized in the non-aqueous (or non-polar) phase through the use of surfactants, and the size of the nanodroplets can control or influence the particle size of the product produced therein.

With respect to tungsten and/or tungsten oxide nanoparticles, a need exists for methods of producing tungsten and/or tungsten oxide nanoparticles with average particle size of less than about 10 nanometers, preferably less than about 5 nanometers.

SUMMARY

The present teachings meet the needs for methods of producing tungsten and tungsten oxide nanoparticles with particle sizes of less than about 10 nanometers, preferably less than about 5 nanometers.

One embodiment of the present teachings provides a method of producing tungsten-containing nanoparticles which includes providing a tungsten-containing component and a microemulsion containing an aqueous nano-domain, a non-aqueous phase, and a surfactant. The tungsten-containing component is mixed with the microemulsion, and the tungsten-containing component is allowed to be hydrolyzed to form tungsten-containing nanoparticles. In this embodiment, the microemulsion contains a sufficient amount of water or a water-containing component to hydrolyze the tungsten-containing component.

Another embodiment of the present teachings provides a method of producing tungsten-containing nanoparticles by providing a first microemulsion and a second microemulsion. The first microemulsion includes a first aqueous nano-domain dispersed in a first non-aqueous phase and a first surfactant, with the first aqueous nano-domain having dissolved therein a tungsten-containing component. The second microemulsion includes a second aqueous nano-domain dispersed in a second non-aqueous phase and a second surfactant, with the second aqueous nano-domain having dissolved therein a precipitating agent. The first microemulsion and the second microemulsion are then contacted with each other, and the tungsten-containing nanoparticles are allowed to precipitate.

BRIEF DESCRIPTION OF THE FIGURES

The accompanying figures, which are included to provide a further understanding of the present teachings and are incorporated in and constitute a part of this specification, illustrate various embodiments of the present teachings and together with the detailed description serve to explain the principles disclosed herein. In the figures.

DETAILED DESCRIPTION

The present methods of producing tungsten-containing nanoparticles include providing a tungsten-containing component and a microemulsion containing aqueous nano-domains, a non-aqueous phase, and a surfactant. The tungsten-containing component is then mixed with the microemulsion, and the tungsten-containing component is allowed to be hydrolyzed to form tungsten-containing nanoparticles. In the present method, the microemulsion can contain a sufficient amount of water or a water-containing component to hydrolyze the tungsten-containing component.

The method can further include isolating the tungsten-containing nanoparticles, drying the isolated tungsten-containing nanoparticles, and reducing the dried tungsten-containing contained nanoparticles to form metallic tungsten, or heating the dried tungsten-containing nanoparticles under air or oxygen to form tungsten oxide nanoparticles. The reduction can be accomplished by exposing tungsten-containing nanoparticles to a sufficiently reducing environment, for instance, the reduction can be accomplished by heating the tungsten-containing nanoparticles to about 500° C. in the presence of at least about 1% by volume hydrogen. The preparation of tungsten oxide nanoparticles can be accomplished by exposing tungsten-containing nanoparticles to oxidation environment, for instance, the heat-treatment can be accomplished by heating the tungsten-containing nanoparticles to about 500° C. under air.

The reduction environment utilized in the present method can include various combinations of concentrations of hydrogen and temperatures sufficient to reduce the tungsten-containing nanoparticles to form metallic tungsten nanoparticles, one of ordinary skill will recognize the multiplicity of possible suitable combinations. Pure hydrogen in combination with heating to about 500° C. can be sufficient to form the desired tungsten-containing nanoparticles, for example.

The heat treatment environment for the preparation of tungsten oxide nanoparticles utilized in the present method can include various combinations of concentrations of oxygen and temperatures sufficient to form tungsten oxide, one of ordinary skill will recognize the multiplicity of possible suitable combinations. Heating to about 400° C. under air can be sufficient to cause formation of crystalline tungsten oxide nanoparticles to be observable by X-ray diffraction, for example.

The tungsten-containing nanoparticles produced can be tungsten oxide or metallic tungsten. Reduction of the tungsten-containing nanoparticles, as set forth above, can, in turn, produce the metallic tungsten nanoparticles. Heat treatment of the tungsten-containing nanoparticles under air or oxygen, as set forth above, can produce tungsten oxide nanoparticles. Removal of solvent by washing of the tungsten-containing nanoparticles prior to reduction can improve the purity of the tungsten-containing nanoparticles.

A high surface area support component can be provided to the microemulsion after the tungsten-containing component is allowed to be hydrolyzed. The high surface area support component can be, for example, carbon powders, zeolites, and aluminas.

The present hydrolysis method can utilize a reverse, or water-in-oil microemulsion. A reverse microemulsion has polar nano-domains, for example, water droplets, which are dispersed in a continuous non-polar phase, for example, cyclohexane or n-heptane. The disperse polar nano-domains can be stabilized by a surfactant. Either ionic or non-ionic surfactants can be utilized in the reverse microemulsion. Generally, the reverse micelle or microemulsion has the disperse polar nano-domains contained within a film or boundary formed by and stabilized by the surfactant.

A suitable surfactant can have a long hydrocarbon chain with one hydrophilic end favoring the aqueous nano-domains of the immiscible liquid of the microemulsion, and the other hydrophobic end of the chain favoring the oil phase. An ionic surfactant can have a charged hydrocarbon chain with the charge balanced by a counterion. Sodium bis (2-ethylhexyl) sulfosuccinate (AOT) and hexadecyltrimethyl ammonium bromide (CTAB) are exemplary ionic surfactants which can be utilized in the present method.

A non-ionic surfactant will possess a neutral charge. Examples of classes of non-ionic surfactants which are suitable in the method according to the present teachings include polyethoxylated alcohols, polyethoxylated phenols, oleates, and laurates. Non-ionic surfactants useful in the present methods include, but are not limited to, for example, the following classes of surfactants, polyoxyethylene derivatives of sorbitan esters, polyoxyethylene fatty ethers, sorbitan fatty acid esters, polyoxyethylene isooctylphenyl ethers, polyoxyethylene nonylphenyl ethers, polyethoxylated hexanol, and pentaethylene glycol dodecyl ether (PEDGD). Commercial embodiments of these suitable surfactants include, for example, Brij-30, Brij-35, Brij-52, Brij-56, Brij-58, Brij-76, Brij-95, Triton X-45,Triton X-100, Triton X-405, Igepal CO-210, Igepal CO-520, Igepal CO-630, Igepal CO-720, Tween 20, Tween 40, Tween 60, Tween 80, Tween 85, Span 20, Span 40, Span 60, Span 80, and Span 85. The Brij, Tween and Span surfactants are available from Uniqema (ICI Americas, Inc.) of Wilmington, Del., Triton surfactant from Dow Chemical of Midland, Mich., and Igepal surfactant from GAF Corporation.

A co-surfactant can also be utilized in the present hydrolysis method. Examples of suitable co-surfactants include, without limitation, 1-butanol and 2-hexanol.

The present method can produce tungsten-containing nanoparticles having an average particle size of less than about 10 nanometers, preferably the average particle size is less than about 5 nanometers, more preferably the average particle size is less than about 3nanometers, and can be less than about 2 nanometers.

The polar phase of the microemulsion or reverse microemulsion can be, for example, water.

The non-polar phase of the microemulsion or reverse microemulsion can be one or more member selected from the group consisting of butanol, cyclohexane, hexanol, heptane, isobutylbenzene, n-octane, isooctane, isopropyl myristate, and hexadecane.

The tungsten-containing component utilized in the hydrolysis reaction method can be a tungsten alkoxides or a tungsten oxyalkoxide, or can be one or more member selected from the group consisting of tungsten ethoxide, tungsten isopropoxide, tungsten butoxide, tungsten oxyethoxide, and tungsten oxybutoxide.

Another method of producing tungsten-containing nanoparticles is provided which includes providing a first microemulsion comprising a first aqueous nano-domain dispersed in a first non-aqueous phase and a first surfactant, wherein the first aqueous nano-domain has dissolved therein a tungsten-containing component, and providing a second microemulsion comprising a second aqueous nano-domain dispersed in a second non-aqueous phase and a second surfactant, wherein the second aqueous phase has dissolved therein a precipitating agent. The first microemulsion and the second microemulsion are mixed or contacted together, and the tungsten-containing nanoparticles are allowed to precipitate out of the combined microemulsions.

This precipitation method can further include collecting or isolating the tungsten-containing nanoparticles, drying the isolated tungsten-containing nanoparticles, and reducing the dried tungsten-containing nanoparticles to form metallic tungsten nanoparticles. The reduction can be accomplished by exposing tungsten-containing nanoparticles to a sufficiently reducing environment, for instance, heating the tungsten-containing nanoparticles to about 500° C. in the presence of at least about 1% by volume hydrogen.

The reduction environment utilized in the present method can include various combinations of concentrations of hydrogen and temperatures sufficient to reduce the tungsten-containing nanoparticles to form metallic tungsten nanoparticles, one of ordinary skill will recognize the multiplicity of possible suitable combinations. Pure hydrogen in combination with heating to about 500° C. can be sufficient to form the desired tungsten-containing nanoparticles, for example.

The tungsten-containing nanoparticles produced by this method can be tungsten oxide or metallic tungsten. Reduction of the tungsten-containing nanoparticles, as set forth above, can produce the metallic tungsten nanoparticles. Additional washing to remove solvents from the tungsten-containing nanoparticles prior to reduction can improve the purity of the tungsten metal nanoparticles.

The present precipitation method can further include providing a high surface area support component to the microemulsion after allowing the tungsten-containing nanoparticles to precipitate. The high surface area support component can be, for example, carbon powders, zeolites, and aluminas.

The present precipitation method can utilize a reverse, or water-in-oil microemulsion. A reverse microemulsion has discontinuous polar nano-domains, for example, water droplets, which are dispersed in a continuous non-polar phase, for example, cyclohexane or n-heptane. The disperse polar nano-domain can be stabilized by a surfactant. Either ionic or non-ionic surfactants can be utilized in the reverse microemulsion. Generally, the reverse micelle has the disperse polar nano-domains contained within a film or boundary formed by and stabilized by the surfactant.

A suitable surfactant can have a long hydrocarbon chain with one hydrophilic end favoring the aqueous nano-domains of the immiscible liquids of the microemulsion, and the other hydrophobic end of the chain favoring the oil phase. An ionic surfactant can have a charged hydrocarbon chain with the charge balanced by a counterion. Sodium bis (2-ethylhexyl) sulfosuccinate (AOT) and hexadecyltrimethyl ammonium bromide (CTAB) are exemplary ionic surfactants which can be utilized in the present method.

A non-ionic surfactant will possess a neutral charge. Examples of classes of non-ionic surfactants which are suitable in the method according to the present teachings include polyethoxylated alcohols, polyethoxylated phenols, oleates, and laurates. Non-ionic surfactants useful in the present methods include, but are not limited to, for example, the following classes of surfactants, polyoxyethylene derivatives of sorbitan esters, polyoxyethylene fatty ethers, sorbitan fatty acid esters, polyoxyethylene isooctylphenyl ethers, polyoxyethylene nonylphenyl ethers, polyethoxylated hexanol, and pentaethylene glycol dodecyl ether (PEDGD). Commercial embodiments of these suitable surfactants include, for example, Brij-30, Brij-35, Brij-52, Brij-56, Brij-58, Brij-76, Brij-95, Triton X-45, Triton X-100, Triton X-405, Igepal CO-210, Igepal CO-520, Igepal CO-630, Igepal CO-720, Tween 20, Tween 40, Tween 60, Tween 80, Tween 85, Span 20, Span 40, Span 60, Span 80, and Span 85. The Brij, Tween and Span surfactants are available from Uniqema (ICI Americas, Inc.) of Wilmington, Del. Triton surfactant from Dow Chemical of Midland, Mich. and Igepal surfactant from GAF Corporation.

In the present precipitation method, the first surfactant and the second surfactant, each independent of the other, can be one or more member selected from the group consisting of polyoxyethylene derivatives of sorbitan esters, polyoxyethylene fatty ethers, sorbitan fatty acid esters, polyoxyethylene isooctylphenyl ethers, polyoxyethylene nonylphenyl ethers, polyethoxylated hexanol, and pentaethylene glycol dodecyl ether.

The first non-aqueous phase and the second non-aqueous phase can be composed of the same or different non-aqueous components. In the present precipitation method, the first non-aqueous phase and the second non-aqueous phase of the respective microemulsions, each independent of the other, can be one or more member selected from the group consisting of butanol, cyclohexane, hexanol, heptane, isobutylbenzene, n-octane, isooctane, isopropyl myristate, and hexadecane. Both of the first and the second microemulsion can contain the same or different surfactants.

According to the present precipitation method, the first microemulsion and the second microemulsion can be reverse microemulsions, and can be composed of the same polar nano-domains, non-polar phase, and surfactant.

The precipitating agent can be one or more member selected from the group consisting of acids such as hydrochloric acid, sulfuric acid or nitric acid. Suitable precipitating agents can be agents that cause the tungsten-containing component to precipitate out of the microemulsion.

According to the present precipitation method, the tungsten-containing nanoparticles produced by the method can have an average particle size of less than about 10 nanometers, preferably the average particle size can be less than about 5 nanometers, preferably the average particle size can be less than about 3 nanometers, and can be less than about 2 nanometers.

For the present precipitation method, the tungsten-containing component can be a tungstate, and can be one or more member selected from the group consisting of sodium tungstate, potassium tungstate, and ammonium tungstate.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Example 1

A reverse microemulsion was prepared by adding 6.0 mL Brij-30 surfactant to a combined 40.0 mL n-heptane (99% Acros Organics) and 0.849 mL deionized water, and then ultrasonically blending for 15 minutes.

An aliquot of 100 mg tungsten isopropoxide (Chemat Technology, Inc.) was dispersed in 25 mL n-heptane, and was then added dropwise to the prepared reverse microemulsion. The reaction mixture was stirred for 4 hours at room temperature. The reaction mixture slowly lost transparency over the four hour stirring time.

The reaction mixture was precipitated overnight by adding acetone. The precipitate was collected by centrifuging, washed repeatedly with acetone and ethanol, and further dispersed in deionized water followed by freeze drying using liquid $N_2$.

Figure 1:
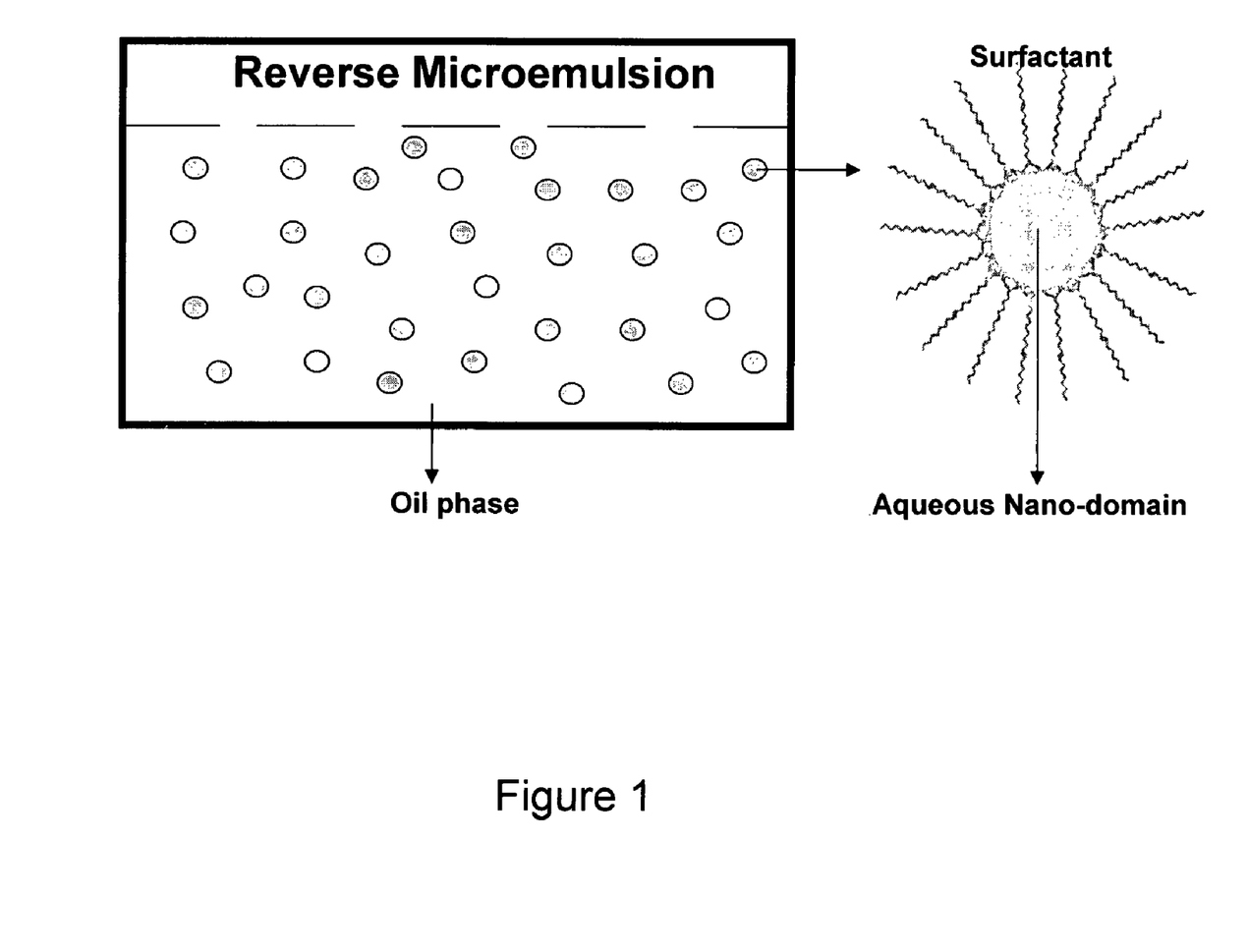
FIG. 1 illustrates a schematic of the principle of reverse microemulsion.
Figure 2:
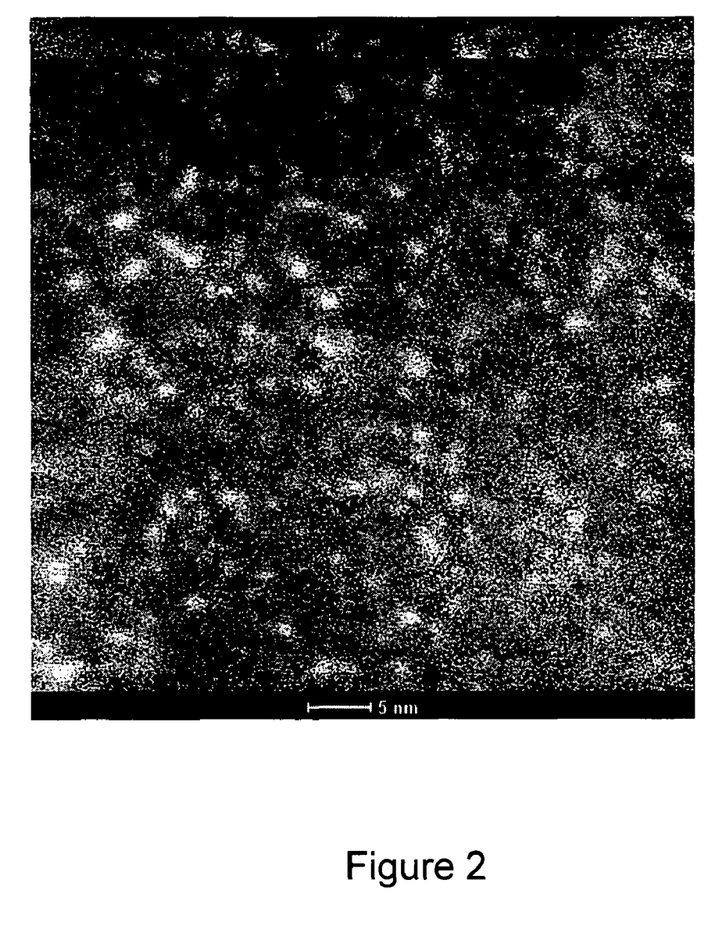
FIG. 2 illustrates the Scanning Transmission Electron Microscopy (STEM) micrograph of tungsten nanoparticles reduced at 500° C.
Figure 3:
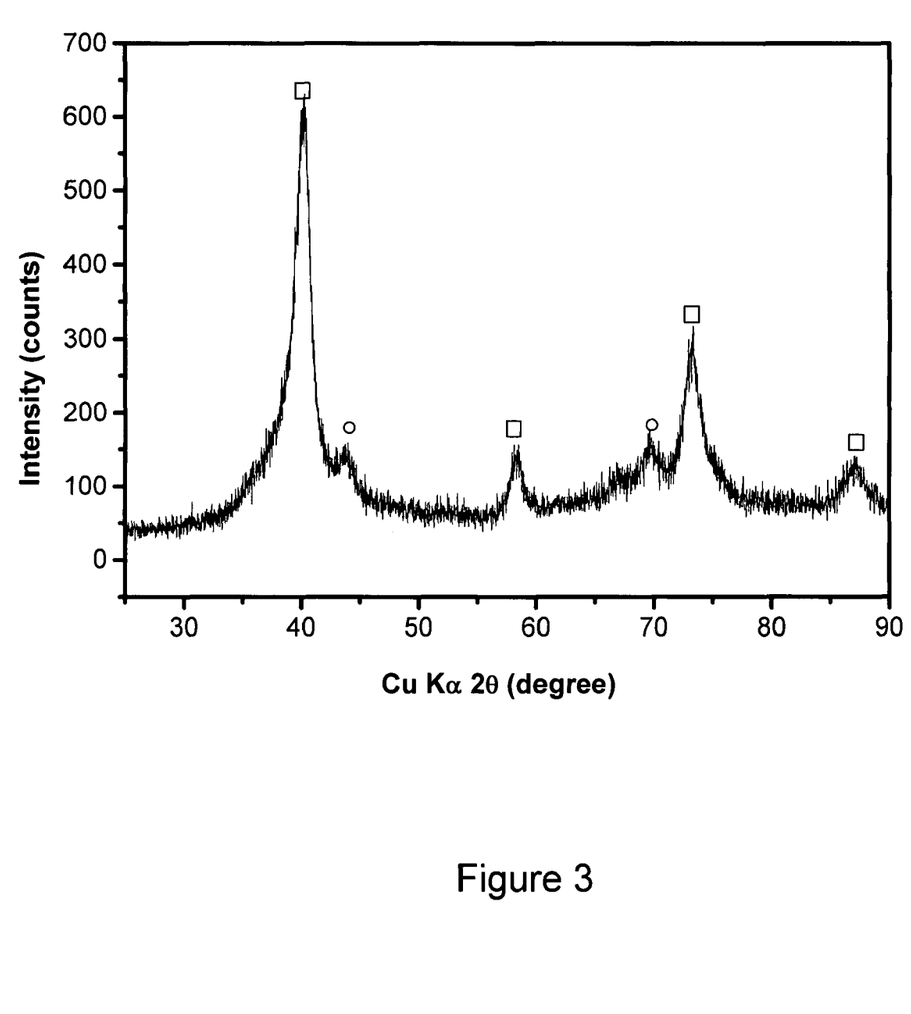
FIG. 3 illustrates the X-ray diffraction patterns of reduced tungsten nanoparticles.

Portions of the powder were then heated to 500° C. under $H_2$. FIG. 2 is the Scanning Transmission Electron Microcopy (STEM) micrograph of the powder heated at 500° C. The particle size of tungsten nanoparticle is about 2 to about 3 nanometers. FIG. 3 is XRD spectra for the powder heated at 500° C. The diffraction peaks are identified as α-W (symbol □) and β-W (symbol ○). Heating to higher temperature, for example, 650° C., results in larger sized particles.

Figure 4:
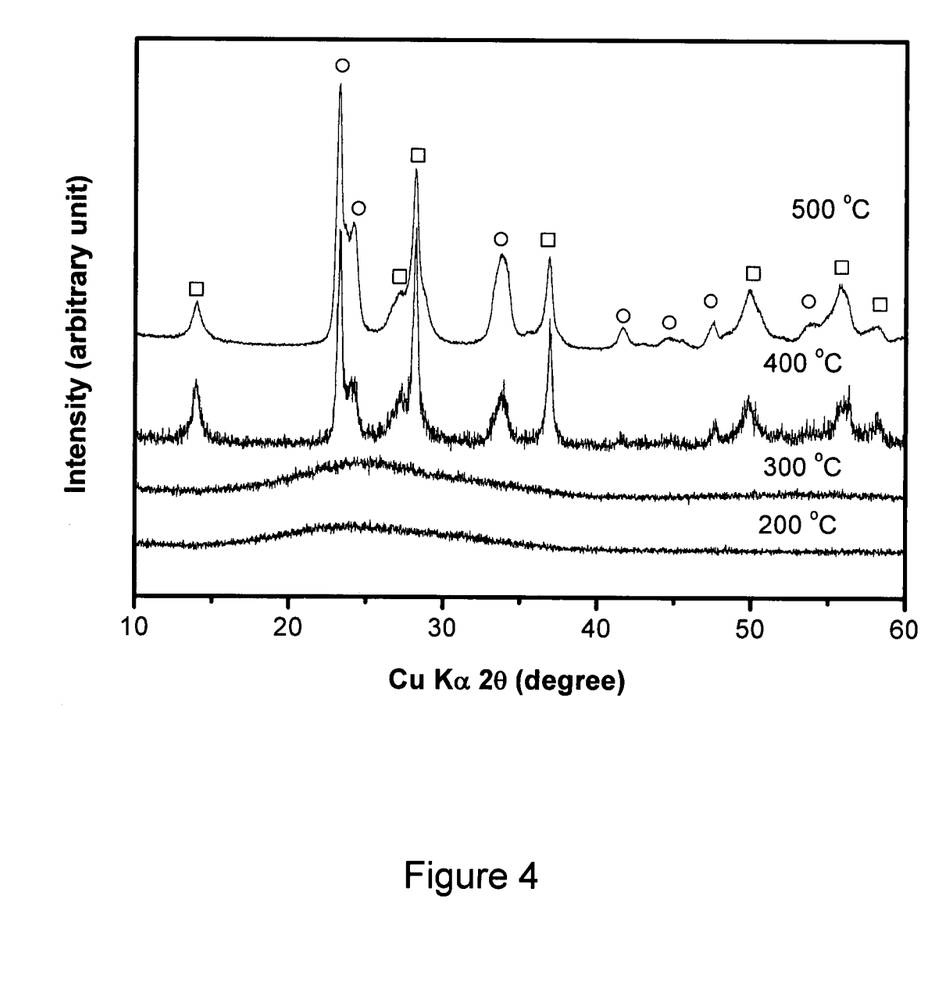
FIG. 4 illustrates the X-ray diffraction patterns of tungsten oxide nanoparticles under air at four different temperatures.

Portions of the powder were then heated to 200° C., 300° C., 400° C., and 500° C., respectively, under air. FIG. 4 is the XRD spectra for the powder heated to those four different temperatures. The results show that amorphous structures are present for heating temperatures below 400° C., and that crystalline structures are observed upon heating to and above 400° C. The powders with crystalline structure were identified by XRD to be tungsten oxides with the mixture of two kinds of structures: hexagonal structure (symbol □) and orthorhombic structure (symbol ○).

Example 2

A reverse microemulsion was prepared by adding 2.980 mL Triton X-100 surfactant and 2.576 ml 2-hexanol (Acros Organics) to a combined 50.0 mL cyclohexane (99% Acros Organics) and 1.134 mL deionized water, and then ultrasonically blending for 15 minutes.

An aliquot of 100 mg tungsten isopropoxide (Chemat Technology, Inc.) was dispersed in 30 mL cyclohexane, and was then added dropwise to the prepared reverse microemulsion. The reaction mixture was then stirred for 4 hours at room temperature. The reaction mixture slowly lost transparency over the four hour stirring time.

Carbon support material (147.2 mg Ketjen Black) sufficient for approximately a 20% loading level was added. The mixture was ultrasonically blended for 15 minutes, stirred for 1 hour, and then acetone was added and stirring continued for another 10 minutes before precipitating the reaction product.

Figure 5:
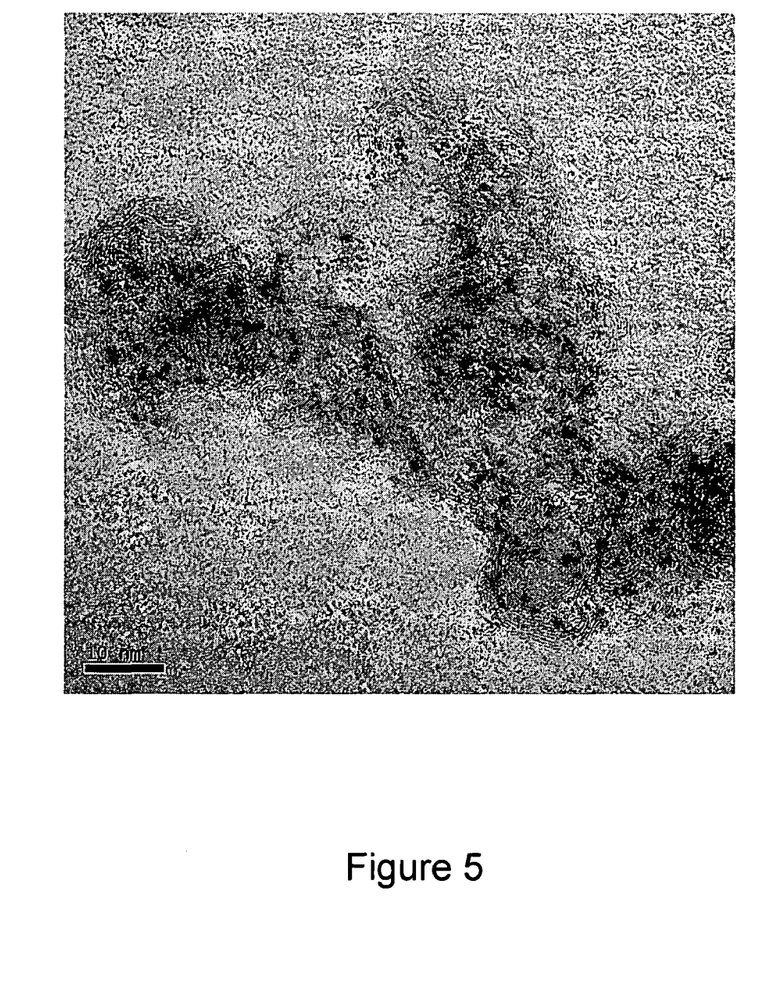
FIG. 5 illustrates the High Resolution Transmission Electron Microscopy (HRTEM) image of carbon supported tungsten-containing nanoparticles before heat treatment.

The precipitate was collected by centrifuging, and then washed once with acetone, an twice with ethanol. The collected powder was then dried under a flowing Ar stream. FIG. 5 shows the High Resolution Transmission Electron Microscopy (HRTEM) micrograph of the carbon supported tungsten-containing nanoparticles, which have particle size of about 2 to about 3 nanometers.

The portions of the powder were then heated to 650° C. under reducing gas atmospheres (either, a mixture of $H_2$ and $N_2$ or pure $H_2$). Since the nanoparticles were supported by high surface area carbon, no dramatic increase in particle size was observed.

Example 3

A first reverse microemulsion was prepared by adding 5.0 g AOT (Acros Organics) to a mixture of 1.012 mL deionized water and 50 mL cyclohexane (Acros Organics), then 0.0652 g $Na_2WO_4$ (Fisher Scientific) were added, and ultrasonically blended for 10 minutes. A second reverse microemulsion was prepared by adding 5.0 g AOT to a mixture of 1.013 mL 1N HCl and 50 mL cyclohexane (Acros Organics), and ultrasonically blending for 10 minutes.

The first and second reverse microemulsions were then added together and stirred at room temperature for 4 hours. Reaction progress was noted by loss of transparency of the reaction mixture.

148.8 mg of Ketjen Black carbon were then added to the reaction mixture, ultrasonically blended for 10 minutes, and stirred for two hours. Acetone was added to precipitate the reaction product.

The precipitate was collected by centrifuging, washed in acetone, and then centrifuged to remove the acetone. This procedure was repeated with ethanol, and then methanol, followed by drying under a flowing Ar stream. The powder was finally heated at 500° C. under flowing air.

Figure 6:
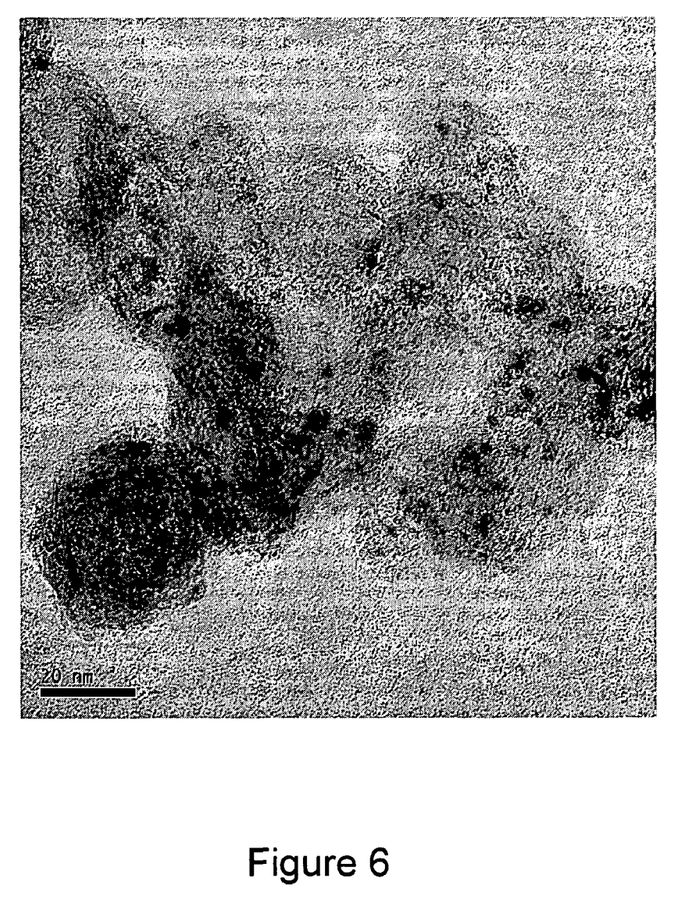
FIG. 6 illustrates the High Resolution Transmission Electron Microscopy (HERTM) image of carbon supported tungsten oxide nanoparticles heated at 500° C. under air.

The High Resolution Transmission Electron Microscopy (HRTEM) image of the powder after the 500° C. heating is shown in FIG. 6. The carbon-supported tungsten oxide particles have particle sizes of about 2 to about 5 nanometers.

Example 4

A reverse microemulsion was prepared by adding 2.980 mL Triton X-100 surfactant and 2.576 ml 2-hexanol (Acros Organics) to a combined 50.0 mL cyclohexane (99% Acros Organics) and 0.561 mL deionized water, and then ultrasonically blending for 10 minutes.

An aliquot of 100 mg tungsten isopropoxide (Chemat Technology, Inc.) was dispersed in 30 mL cyclohexane, the solution was then added dropwise to the prepared reverse microemulsion. The reaction mixture was then stirred for 4 hours at room temperature. The reaction mixture slowly lost transparency over the four hour stirring time.

Carbon support material (147.2 mg Ketjen Black carbon) sufficient for approximately a 20% loading level was added.

The mixture was ultrasonically blended for 15 minutes, stirred for 15 minutes, and then acetone was added and stirring continued for another 10 minutes. The reaction product was allowed to precipitate overnight.

The precipitate was collected by centrifuging, and then washed once with acetone, and twice with ethanol. The collected powder was then dried under a flowing Ar stream. Portions of the powder were then heated to 650° C. under $H_2$.

Figure 7:
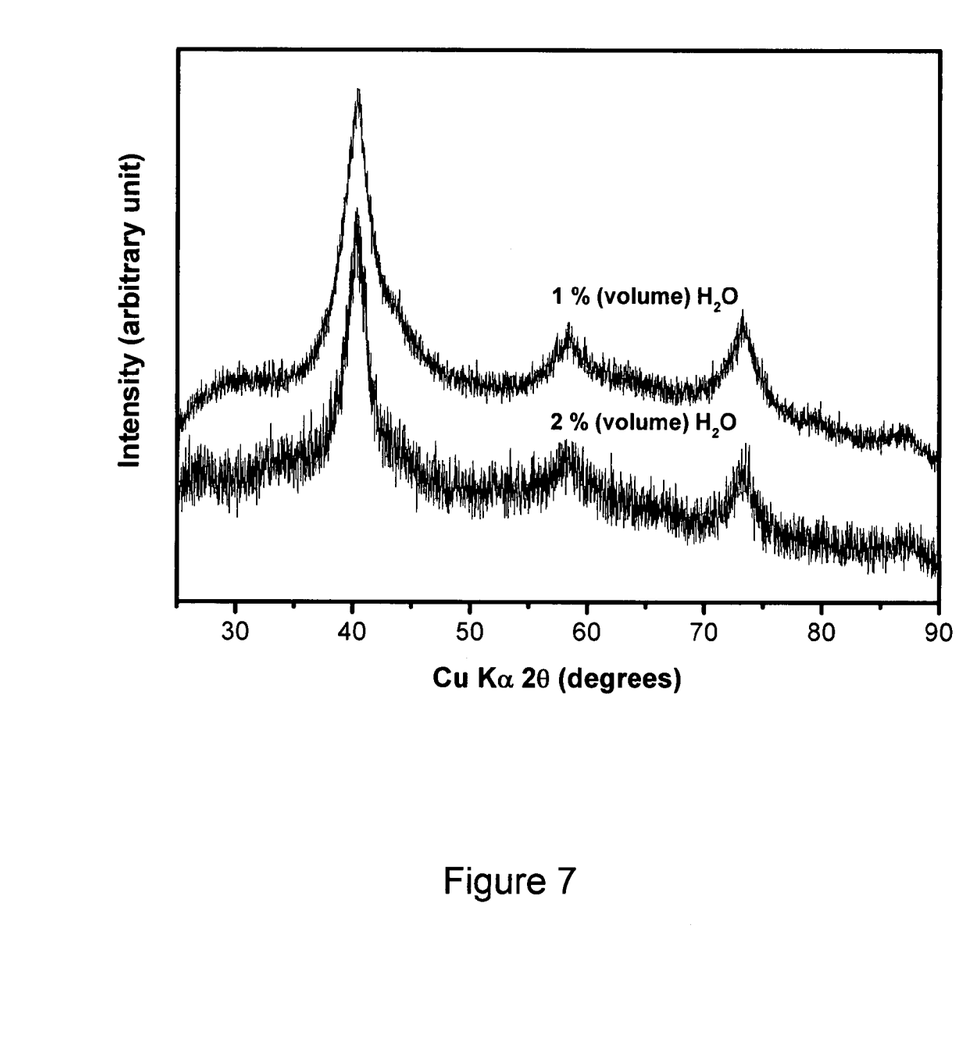
FIG. 7 illustrates the X-ray diffraction patterns of carbon supported tungsten nanoparticles prepared in reverse microemulsions at two different concentrations of water.

FIG. 7 is the XRD spectra for the powder prepared under the conditions set forth in Example 2 above, and at the reduced water concentrations detailed here.

The diffraction patterns observed are generally the same but with broader diffraction peaks observed for the reaction run at the lower water concentration in the reverse microemulsion. The broader diffraction peaks are indicative of smaller particles. A proposed theory, without limitation, is the particle size and shape depend mainly on the size of the water droplets, which are thermodynamically determined by the water-to-surfactant molar ratio, and thus, the lower water concentration will result in more dispersed, smaller water droplets which, in turn, provide the observed smaller particles.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of producing tungsten-containing nanoparticles, comprising providing a tungsten alkoxide; providing a microemulsion comprising two immiscible liquids, one aqueous liquid and one non-aqueous liquid, and a surfactant; mixing the tungsten alkoxide with the microemulsion at room temperature; allowing the tungsten alkoxide to be hydrolyzed to form tungsten-containing nanoparticles at room temperature; removing the surfactant by washing; and reducing the tungsten-containing nanoparticles to form metallic tungsten nanoparticles, wherein the microemulsion contains a sufficient amount of a water-containing component to hydrolyze the tungsten alkoxide and the tungsten-containing nanoparticles have an average particle size of less than about 5 nanometers, and wherein reducing comprises heating the tungsten-containing nanoparticles to about 500° C. in the presence of at least about 1% by volume hydrogen.

2. The method according to claim 1, further comprising
   providing a high surface area support component to the microemulsion after allowing the tungsten alkoxide to be hydrolyzed.

3. The method according to claim 1, wherein the microemulsion is a reverse microemulsion.

4. The method according to claim 1, wherein the tungsten alkoxide comprises one or more member selected from the group consisting of tungsten ethoxide, tungsten isopropoxide, tungsten butoxide, tungsten oxyethoxide, tungsten oxypropoxide, and tungsten oxybutoxide.

5. The method according to claim 1, wherein the non-aqueous phase comprises one or more member selected from the group consisting of butanol, cyclohexane, hexanol, heptane, isobutylbenzene, n-octane, isooctane, isopropyl myristate, and hexadecane.

6. The method according to claim 1, wherein the surfactant comprises one or more member selected from the group consisting of sodium bis(2-ethylhexyl) sulfosuccinate, hexadecyltrimethyl ammonium bromide, polyoxyethylene derivatives of sorbitan esters, polyoxyethylene fatty ethers, sorbitan fatty acid esters, polyoxyethylene isooctylphenyl ethers, polyoxyethylene nonylphenyl ethers, polyethoxylated hexanol, and pentaethylene glycol dodecyl ether.

7. A method of producing tungsten-containing nanoparticles, comprising providing a tungsten alkoxide; providing a microemulsion comprising two immiscible liquids, one aqueous liquid and one non-aqueous liquid, and a surfactant; mixing the tungsten alkoxide with the microemulsion at room temperature; and allowing the tungsten alkoxide to be hydrolyzed to form tungsten-containing nanoparticles at room temperature; removing the surfactant by washing, oxidizing the tungsten-containing nanoparticles to form crystalline tungsten oxide nanoparticles, wherein the microemulsion contains a sufficient amount of a water-containing component to hydrolyze the tungsten alkoxide and the tungsten-containing nanoparticles have an average particle size of less than about 5 nanometers, and wherein oxidizing comprises heating the tungsten-containing nanoparticles to about 400° C. or above in an oxygen-containing atmosphere.

8. The method according to claim 7, wherein oxidizing comprises heating the tungsten-containing nanoparticles to no more than 400° C. in an oxygen-containing atmosphere.

9. The method according to claim 7, further comprising providing a high surface area support component to the microemulsion after allowing the tungsten alkoxide to be hydrolyzed.

10. The method according to claim 7, wherein the microemulsion is a reverse microemulsion.

11. The method according to claim 7, wherein the tungsten alkoxide comprises one or more member selected from the group consisting of tungsten ethoxide, tungsten isopropoxide, tungsten butoxide, tungsten oxyethoxide, tungsten oxypropoxide, and tungsten oxybutoxide.

12. The method according to claim 7, wherein the non-aqueous phase comprises one or more member selected from the group consisting of butanol, cyclohexane, hexanol, heptane, isobutylbenzene, n-octane, isooctane, isopropyl myristate, and hexadecane.

13. The method according to claim 7, wherein the surfactant comprises one or more member selected from the group consisting of sodium bis(2-ethylhexyl) sulfosuccinate, hexadecyltrimethyl ammonium bromide, polyoxyethylene derivatives of sorbitan esters, polyoxyethylene fatty ethers, sorbitan fatty acid esters, polyoxyethylene isooctylphenyl ethers, polyoxyethylene nonylphenyl ethers, polyethoxylated hexanol, and pentaethylene glycol dodecyl ether.

* * * * *